United States Patent [19]
Hirasaki et al.

[11] Patent Number: 5,644,441
[45] Date of Patent: Jul. 1, 1997

[54] LENS MOUNT FOR TV CAMERA

[75] Inventors: Norio Hirasaki; Tomomi Iguchi, both of Saitama-ken, Japan

[73] Assignee: Fuji Photo Optical Co., Ltd., Saitama-ken, Japan

[21] Appl. No.: 545,315

[22] Filed: Oct. 19, 1995

[30] Foreign Application Priority Data

Oct. 20, 1994 [JP] Japan ................................ 6-254904

[51] Int. Cl.⁶ .................................................. G02B 7/02
[52] U.S. Cl. ............................ 359/828; 359/827; 396/531
[58] Field of Search ..................................... 359/827, 828; 354/286

[56] References Cited

U.S. PATENT DOCUMENTS

| | | | |
|---|---|---|---|
| 4,239,364 | 12/1980 | Doi | 354/286 |
| 4,247,190 | 1/1981 | Hashimoto et al. | 354/286 |
| 4,448,509 | 5/1984 | Katsuma et al. | 359/828 |
| 4,457,609 | 7/1984 | Tomino et al. | 354/286 |
| 4,600,277 | 7/1986 | Murray, Jr. | 359/828 |
| 5,483,384 | 1/1996 | Takizawa et al. | 359/827 |

*Primary Examiner*—Loha Ben
*Attorney, Agent, or Firm*—Sixbey Friedman Leedom & Ferguson; Gerald J. Ferguson, Jr.; Thomas W. Cole

[57] ABSTRACT

A lens mount for a TV camera for mounting a lens having a bayonet ring on its rear face and a cylindrical projection which is smaller in diameter than the bayonet ring and extends rearward coaxially with the optical axis of the lens is provided with a camera-side bayonet ring which is movable between an engagement position where the camera-side bayonet ring is engaged with the lens side bayonet ring to hold the lens on the camera and a disengagement position where the bayonet rings are disengaged from each other to permit removal of the lens from the camera. Three chucking pieces are supported on a support ring at regular intervals in a circumferential direction of the support ring and are movable toward and away from the longitudinal axis of the support ring which is in alignment with the optical axis of the camera between a retracted position where they are away from the outer surface of the inserted cylindrical projection on the lens and a chucking position where they abut against the outer surface of the inserted cylindrical projection from three directions and locate the lens so that the optical axes of the lens and the camera are aligned with each other.

5 Claims, 6 Drawing Sheets

F I G. 1A
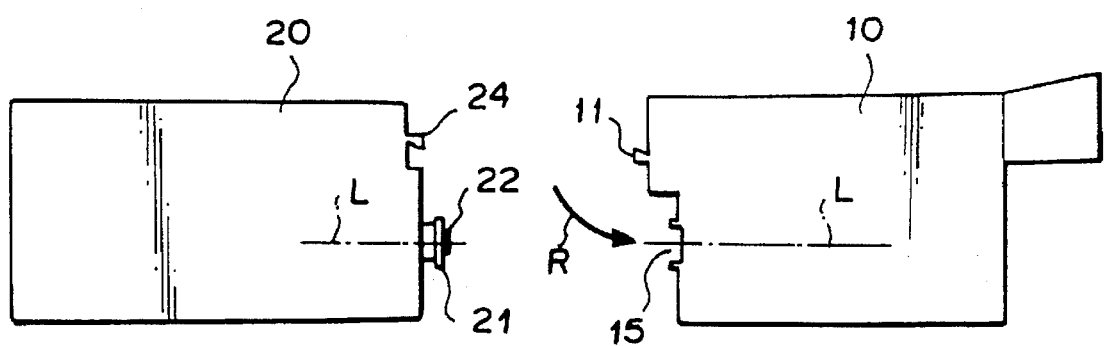
F I G. 1B
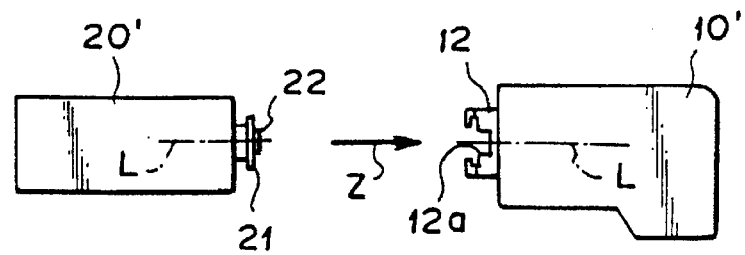

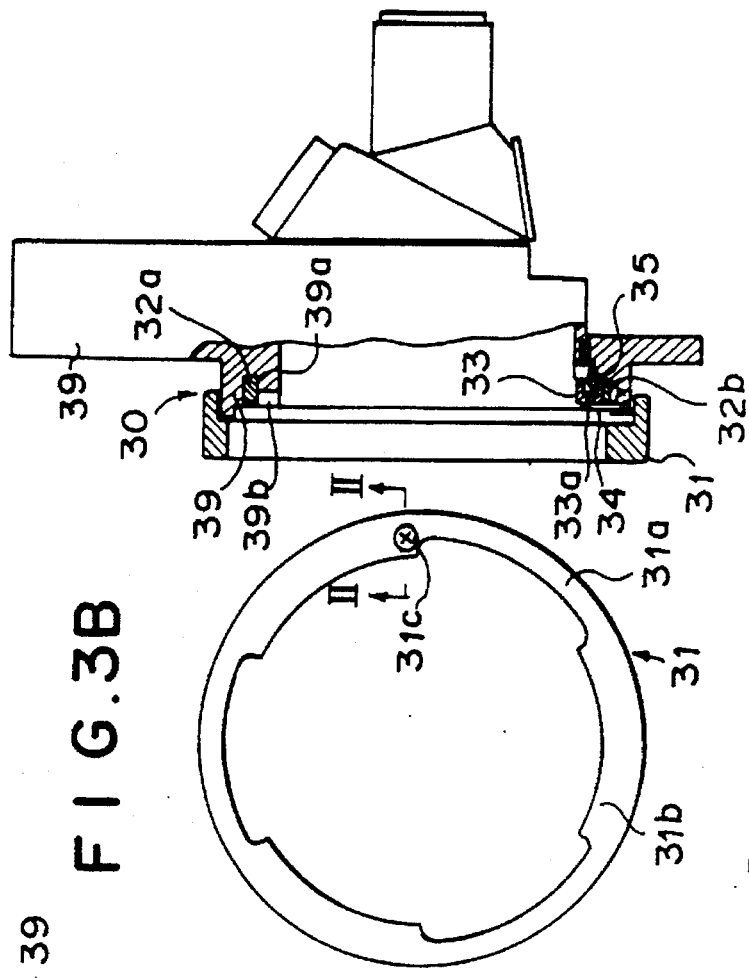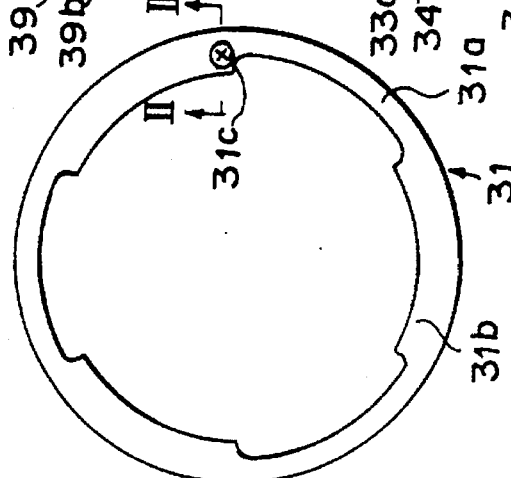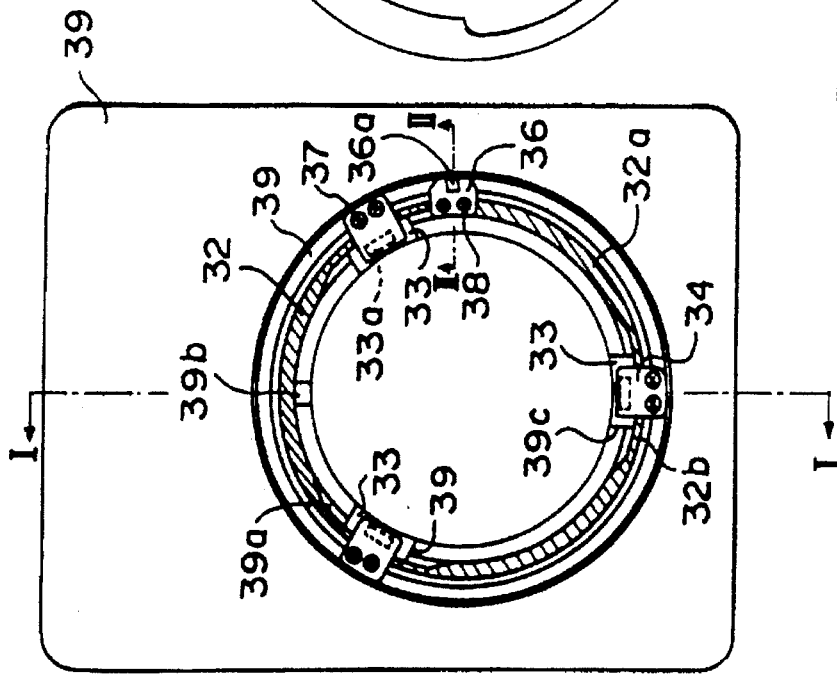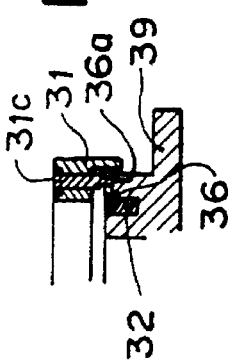

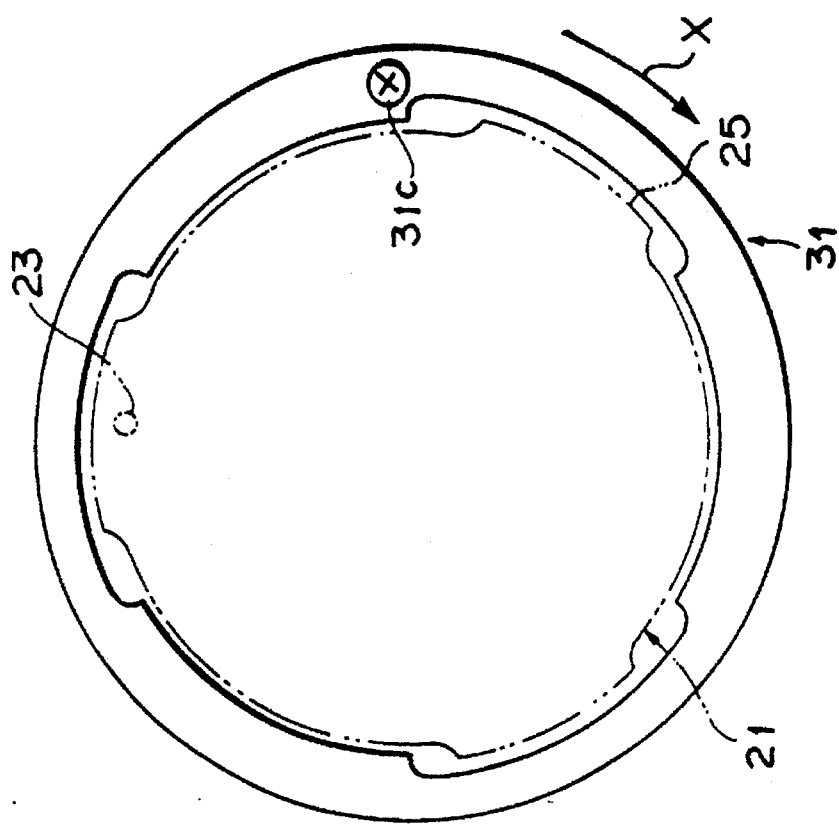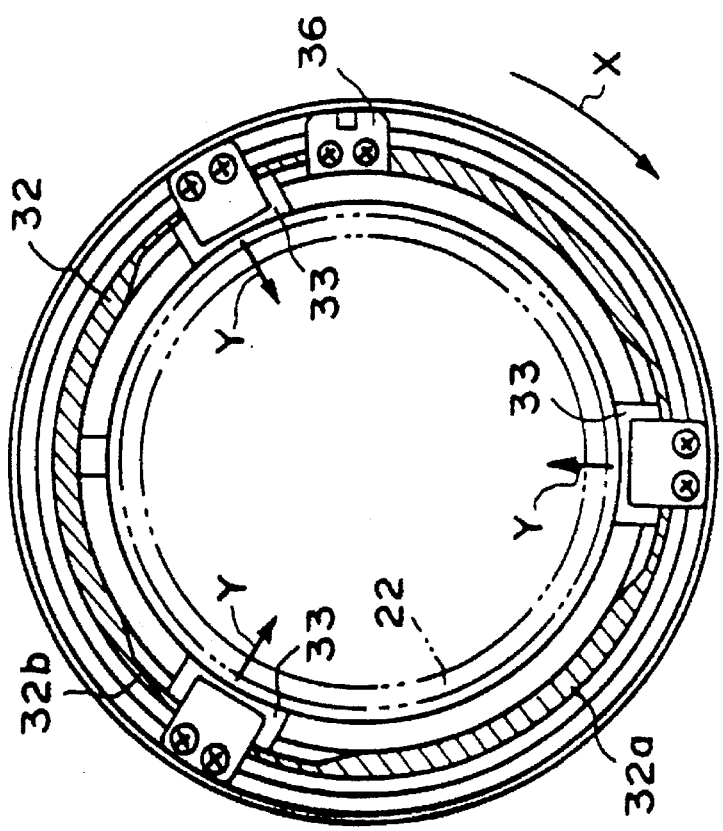

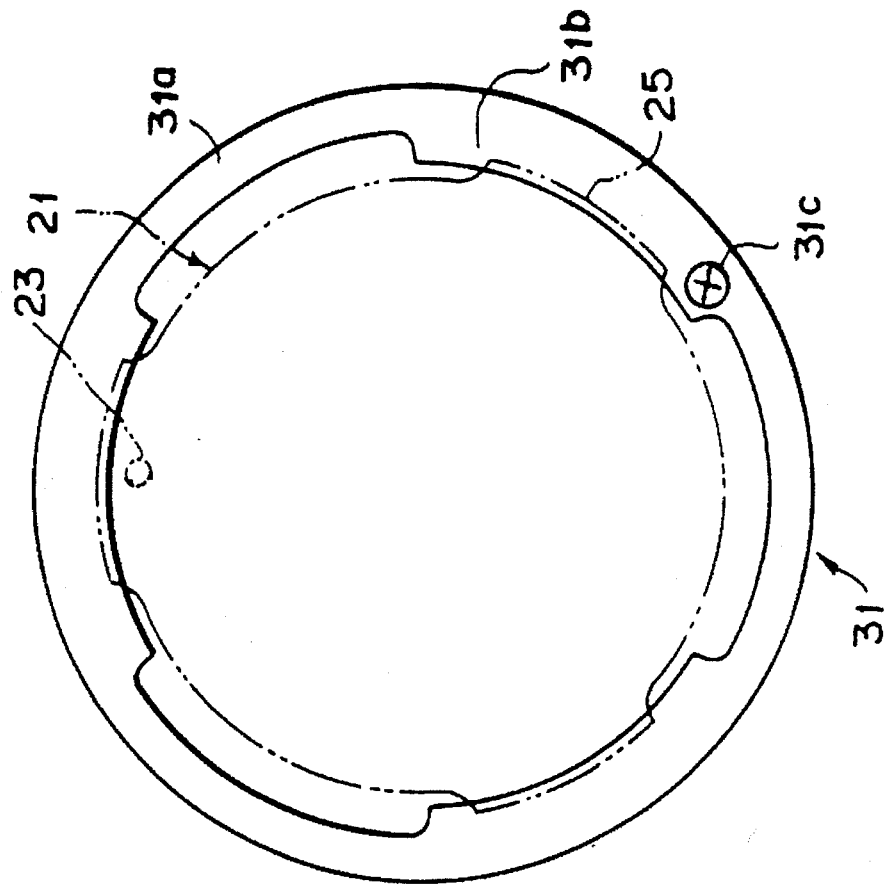
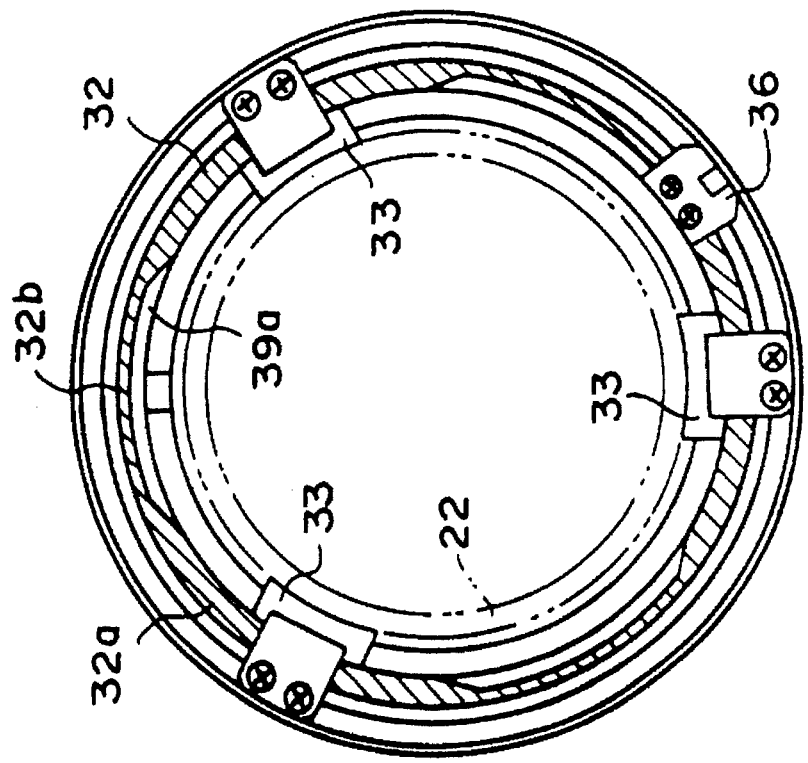

LENS MOUNT FOR TV CAMERA

BACKGROUND OF THE INVENTION

1. Field of the Invention

This invention relates to a lens mount for a TV camera, and more particularly to a lens mount for a TV camera which permits lenses having different types of mounts to be mounted on the TV camera.

2. Description of the Related Art

Generally a large-sized lens is mounted on a large-sized TV camera which is generally placed on a truck with casters and used in a limited space like a TV studio and a small-sized lens is mounted on a small-sized TV camera which is generally used on a cameraman's shoulder as a portable camera in a site including the open field.

As shown in FIG. 1B, the small-sized lens 20' is generally mounted on the small-sized TV camera 10' by way of a bayonet mount comprising a pair of bayonet rings 21 and 12 respectively fixed to the lens 20' and the camera 10' for the purpose of easiness in changing the lens. The bayonet ring 21 on the side of the lens 20' is provided with a cylindrical projection 22 which is smaller in diameter than the bayonet ring 21 and extends rearward in the direction of the optical axis L. The projection 22 functions as a locator for aligning the optical axes of the lens 20' and the camera 10' with each other. That is, the camera 10' is provided with an insertion hole 12a which has an inner diameter substantially equal to the outer diameter of the projection 22 and into which the projection 22 is telescopically inserted. When the lens 20' is mounted on the camera 10', the projection 22 is first inserted into the insertion hole 12a with the optical axes L of the camera 10' and the lens 20' in alignment with each other and then the bayonet rings 12 and 21 are brought into engagement with each other.

Since the large-sized lens 20 (FIG. 1A) is sometimes mounted on the small-sized TV camera 10', the large-sized lens 20 is also provided with a bayonet ring 21 and a projection 22 similar to those for the small-sized lens 20'.

As shown in FIG. 1A, the large-sized lens 20 is generally mounted on the large-sized camera 10 by way of hook mounts 24 and 11 provided respectively on the rear end face of the lens 20 and the front end face of the camera 10. When mounting the lens 20 on the camera 10, the hook mount 24 on the lens 20 is first brought into engagement with the hook mount 11 on the camera 10 with the front portion of the lens 20 held high and then the lens 20 is swung downward about the hook mounts 24 and 11 as shown by arrow R. Thereafter the lens 20 is fixed to the camera 20 with the optical axes L in alignment with each other. Since the large-sized lens 20 is mounted on the large-sized camera 10 by way of the hook mounts 24 and 11, the large-sized camera 10 is not provided with a bayonet ring and in order to prevent the bayonet ring 21 and the projection 22 from interfering with the large-sized camera 10, a recess 15 for accommodating the bayonet ring 21 and the projection 22 is provided on the front end face of the camera However the small-size lens 20' is sometimes to be mounted on the large-sized camera 10. In such a case, since the small-sized lens 20' is not provided with a hook mount, a bayonet adapter (not shown) which can be engaged with the bayonet ring 22 on the small-sized camera 20' is screwed on the large-sized camera 10.

This system is disadvantageous in that the bayonet adapter must be screwed on and off the large-sized camera 10 every time the type of mount to be mounted on the camera changes, which is very troublesome. Further there is a fear of the bayonet adapter getting lost.

SUMMARY OF THE INVENTION

In view of the foregoing observations and description, the primary object of the present invention is to provide a lens mount for a TV camera which can be constantly on the TV camera irrespective of the type of mount on the lens and permits lenses having different types of mounts to be mounted on the TV camera with a simple operation.

The lens mount for a TV camera in accordance with the present invention is for mounting a lens having a bayonet ring on its rear face and a cylindrical projection which is smaller in diameter than the bayonet ring and extends rearward coaxially with the optical axis of the lens and comprises a camera-side bayonet ring which is movable relative to the lens-side bayonet ring between an engagement position where the bayonet rings are engaged with each other to hold the lens on the camera and a disengagement position where the bayonet rings are disengaged from each other to permit removal of the lens from the camera, and a chucking means which is movable back and forth in a radial direction of the camera-side bayonet ring between a retracted position where it is away from the outer surface of the cylindrical projection on the lens and a chucking position where it abuts against the outer surface of the cylindrical projection.

In one embodiment of the present invention, the chucking means comprises at least three chucking pieces which are supported on a support ring at regular intervals in a circumferential direction of the support ring and are movable toward and away from the longitudinal axis of the support ring, which is in alignment with the optical axis of the camera, between a retracted position where they are away from the outer surface of the inserted cylindrical projection on the lens and a chucking position where they abut against the outer surface of the inserted cylindrical projection from three directions and locate the lens so that the optical axes of the lens and the camera are aligned with each other.

Preferably the chucking pieces are operatively connected to the lens-side or camera-side bayonet ring so that the chucking pieces are in the retracted position when the bayonet rings are in the disengagement position and is moved to the chucking position in response to movement of the bayonet ring to the engagement position.

More preferably the chucking pieces reach the chucking position slightly before the bayonet ring reaches the engagement position.

When a lens is mounted on the camera, the lens-side bayonet ring is held in the disengagement position and the chucking means is held in the retracted position. In the retracted position, the chucking means is wide opened and does not interfere with the cylindrical projection on the lens even if the lens is swung about the hook mounts as described above in conjunction with mounting the large-sized lens on the large-sized camera. Accordingly a large-sized camera provided with the mount of the present invention can be mounted with a large-sized lens having thereon a bayonet ring and a cylindrical projection together with a hook mount without removing the mount of the present invention.

When a small-sized lens having only a bayonet mount, i.e., a bayonet ring and a cylindrical projection, the bayonet ring and the projection are inserted into the camera-side bayonet ring and the space surrounded by the chucking means with the camera-side bayonet ring held in the disengagement position and the chucking means in the retracted position. Then the camera-side bayonet ring or the lens-side bayonet ring is rotated to the engagement position to hold the lens on the camera. At the same time, the chucking means is moved to the chucking position to locate the lens with respect to the camera so that the optical axes of the lens and the camera are aligned with each other. The chucking means may be moved to the chucking position in response to rotation of the bayonet ring to the engagement position, or may be moved to the chucking position independently from the bayonet ring.

BRIEF DESCRIPTION OF THE DRAWINGS

FIGS. 1A and 1B are schematic views showing different types of lens mount for a TV camera, FIG. 3A is a front view of the mount with the camera-side bayonet ring removed, FIG. 3B is a front view of the bayonet ring, FIG. 3C is a cross-sectional view taken along line I—I in FIG. 3A with the camera-side bayonet ring attached, FIG. 3D is a cross-sectional view taken along line II—II in FIG. B, FIG. 4A is a front view of the mount with the camera-side bayonet ring removed showing the state where the camera-side bayonet ring is in the disengagement position, FIG. 4B is a front view of the camera-side bayonet ring in the disengagement position, FIG. 5A is a front view of the mount with the camera-side bayonet ring removed showing the state where the camera-side bayonet ring is in the engagement position, FIG. 5B is a front view of the camera-side bayonet ring in the engagement position.

DESCRIPTION OF THE PREFERRED EMBODIMENT

Figure 2:
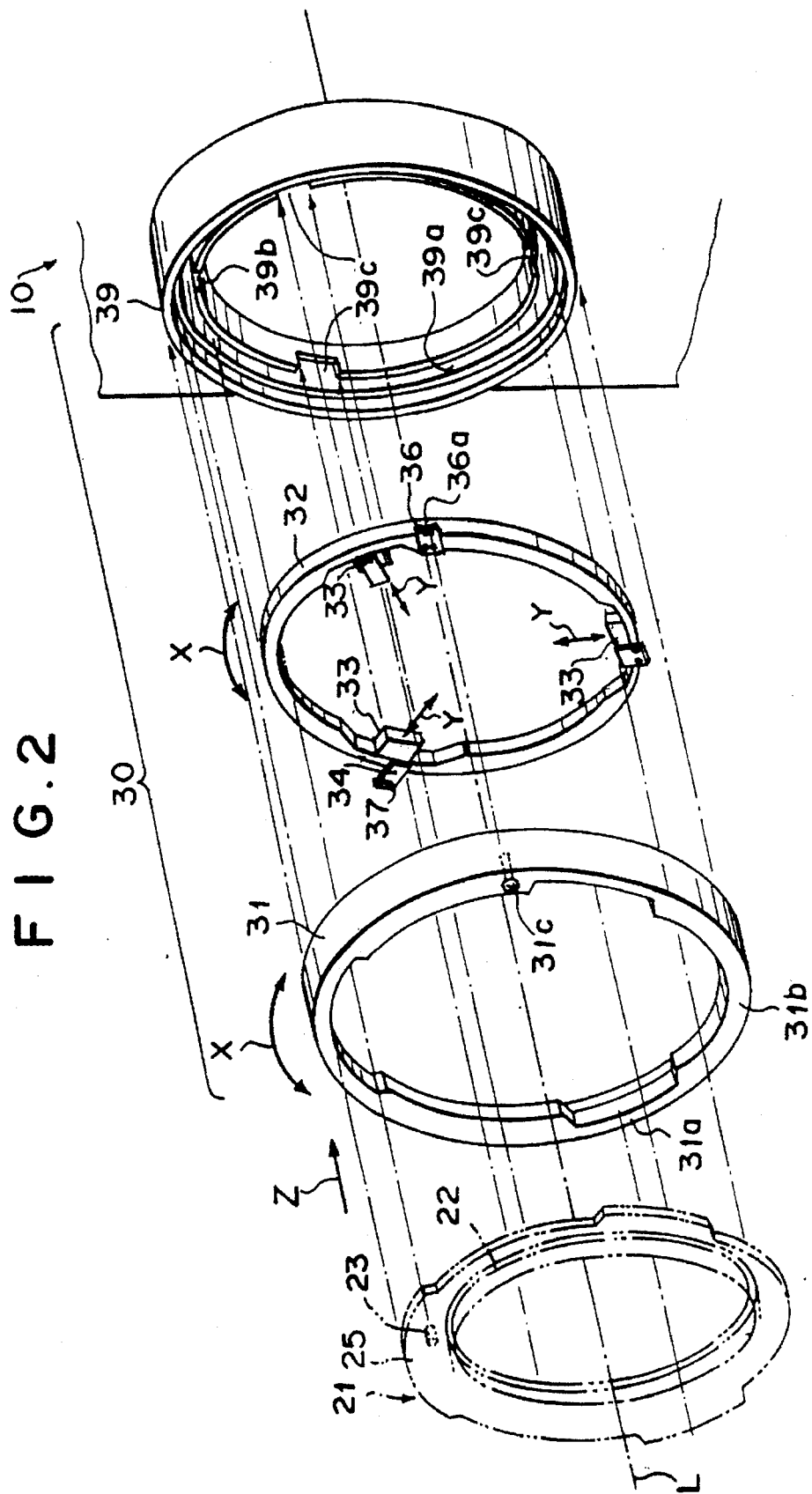
FIG. 2 is an exploded perspective view of a mount in accordance with an embodiment of the present invention.

In FIGS. 2 and 3A to 3D, a lens mount 30 for a TV camera in accordance with an embodiment of the present invention comprises a base portion 39 formed on a TV camera body 10. A camera-side bayonet ring 31 is mounted on the base portion 39 to be rotatable in the circumferential direction (the direction of arrow X) between an engagement position where it is in engagement with a lens-side bayonet ring 21 to hold the lens on the camera body 10 and an disengagement position where it is out of engagement with the lens-side bayonet ring 21 to permit the lens to be mounted on and demounted from the camera body 10. A cam ring 32 is fitted in an annular groove 39a formed on the base portion 39 to be rotatable in the circumferential direction (the direction of arrow X) along the groove 39a. Three chucking pieces 33 are fitted in three cutaway portions 39c formed in the base portion 39 to be movable in the radial direction of the cam ring 32 (the direction of arrow Y) according to the shape of cam formed on the inner peripheral surface of the cam ring 32 with the movement of the chucking pieces 33 in the circumferential direction limited by the cutaway portions 39c.

The base portion 39 need not be formed directly on the camera body 10 but may be a member which is separately formed and fixed to the camera body 10. The base portion 39 is further provided with a cutaway portion 39b which is engaged with a stopper pin 23 formed on the lens-side bayonet ring 21 and limits movement of the bayonet ring 21 in the circumferential direction.

The bayonet ring 31 has three thin portions (thin as measured in the radial direction) 31a and three thick portions 31b alternately formed in the circumferential direction thereof. The center-to-center distance between the thin and thick portions 31a and 31b as measured in the circumferential direction is about 60°. By inserting the three claws 25 of the lens-side bayonet ring 21 into the recesses between the thick portions 31b and rotating the camera-side bayonet ring 31 by about 60° in the direction of arrow X, the claws 25 are brought into engagement with the thick portions 31b and the bayonet ring 21 is fixed to the bayonet ring 31.

The cam ring 32 is provided on its inner peripheral surface with three protrusions 32a and three recesses 32b alternately arranged in the circumferential direction. The center-to-center distance between the protrusion 32a and the recess 32b as measured in the circumferential direction is about 60°. An interlocking plate 36 is fixed to the front face of the cam ring 32 facing the bayonet ring 31 by bolts 38. The interlocking plate 36 is provided with a cutaway portion 36a and an interlocking pin 31c extending rearward from the bayonet ring 31 is adapted to be received in the cutaway portion 36a as shown in FIG. 3D. When the interlocking pin 31c is in the cutaway portion 36a, the cam ring 32 is rotated in response to rotation of the bayonet ring 31 by way of engagement between the interlocking pin 31c and the interlocking plate 36.

When the interlocking pin 31c is in the cutaway portion 36a, the thin portions 31a of the bayonet ring 31 are aligned with the protrusions 32a of the cam ring 32 and the thick portions 31b of the bayonet ring 31 are aligned with the recesses 32b of the cam ring 32.

The chucking pieces 33 fitted in the cutaway portions 39c of the base portion 39 are urged against the inner peripheral surface of the cam ring 32 under the force of a spring 35 one end portion of which is inserted into a hole formed in the rear face of each chucking piece 33 as shown in FIG. 3C. The front end face of each chucking piece 33 facing the bayonet ring 31 is in abutment against a retainer plate 34 fixed to the base portion 39 by a bolt 37 and the chucking piece 33 is held in the cutaway portion 39c.

Thus the chucking pieces 33 are movable only in the direction of arrow Y. The diameter of an imaginary circle circumscribed with the inner end faces of the three chucking pieces 33 is maximized (e.g., 45 mm) when the chucking pieces 33 are on the recesses 32b of the cam ring 32, and minimized when the chucking pieces 33 are on the protrusions 32a (e.g., 42 mm). The imaginary circle is set to have its center on the optical axis of the camera 10. The minimum diameter of the imaginary circle is set to be substantially equal to the outer diameter of the cylindrical projection 22 which is smaller in diameter than the bayonet ring 21 and extends rearward in the direction of the optical axis L as described above in conjunction with FIGS. 1A and 1B.

The operation of the mount 30 of this embodiment will be described, hereinbelow. FIGS. 4A and 4B show the condition where the bayonet rings 21 and 31 are in the ready-to-engage position with the camera-side bayonet ring 31 in the disengagement position. The condition where the bayonet rings 21 and 31 are in the ready-to-engage position is the condition where the lens-side bayonet ring 21 is just inserted into the camera-side bayonet ring 31 and is not still engaged with the same. FIGS. 4A and 4B respectively correspond to FIGS. 3A and 3B. FIGS. 5A and 5B show the condition where the camera-side bayonet ring 31 is in the engagement position. FIGS. 5A and 5B respectively correspond to FIGS. 3A and 3B.

With the camera-side bayonet ring 31 in the disengagement position, the lens-side bayonet ring 21 is positioned in the circumferential direction so that the stopper pin 23 on the bayonet ring 21 is aligned with the cutaway portion 39b of the base portion 39 (FIG. 2) and is inserted into the camera-side bayonet ring 31 (FIG. 4B), whereby the stopper pin 23 is engaged with the cutaway portion 39b and limits the circumferential position of the bayonet ring 21 on this time, the chucking pieces 33 are on the recesses 32b of the cam rings 32 as shown in FIG. 4A and accordingly the aforesaid imaginary circle defined by the inner end faces of the chucking pieces 33 is maximized, i.e., 45 mm. When the lens-side bayonet ring 21 is inserted into the camera-side bayonet ring 31, the projection 22 on the lens is inserted into the space surrounded by the chucking pieces 33. Since the diameter of the space is 45 mm and larger than the outer diameter of the projection 22 (42 mm) at this time, the projection 22 can be easily inserted into the space even if the projection 22 is inserted with the optical axis L of the lens inclined relative to the optical axis of the camera. Thus mounting the lens on the camera is facilitated.

Then the camera-side bayonet ring 31 is rotated by about 60° in the direction of arrow X, whereby the claws 25 of the lens-side bayonet ring 21 are brought into engagement with the thick portions 31b (FIG. 5B) and the lens is fixed to the camera body.

When the camera-side bayonet ring 31 is rotated by about 60° in the direction of arrow X, the cam ring 32 is also rotated by about 60° in the direction of arrow X by way of the engagement between the interlocking pin 31c and the interlocking plate 36 and the chucking pieces 33 come to rest on the protrusions 32a of the cam ring 32 since the chucking pieces 33 are restrained from moving in the circumferential direction and the direction of the optical axis as described above.

When the chucking pieces 33 come to rest on the protrusions 32a of the cam ring 32, the chucking pieces 33 are pushed toward the center of the cam ring 32 overcoming the force of the spring 35 and the aforesaid imaginary circle defined by the inner end faces of the chucking pieces 33 is minimized to 42 mm. As a result, the chucking pieces 33 abut against the projections 22 of the lens from three directions as shown in FIG. 5A, whereby the projection 22 is located so that the axis of the projection 22, i.e., the optical axis of the lens, is aligned with the center of the imaginary circle and the optical axes of the lens and the camera are aligned with each other.

Figure 6:
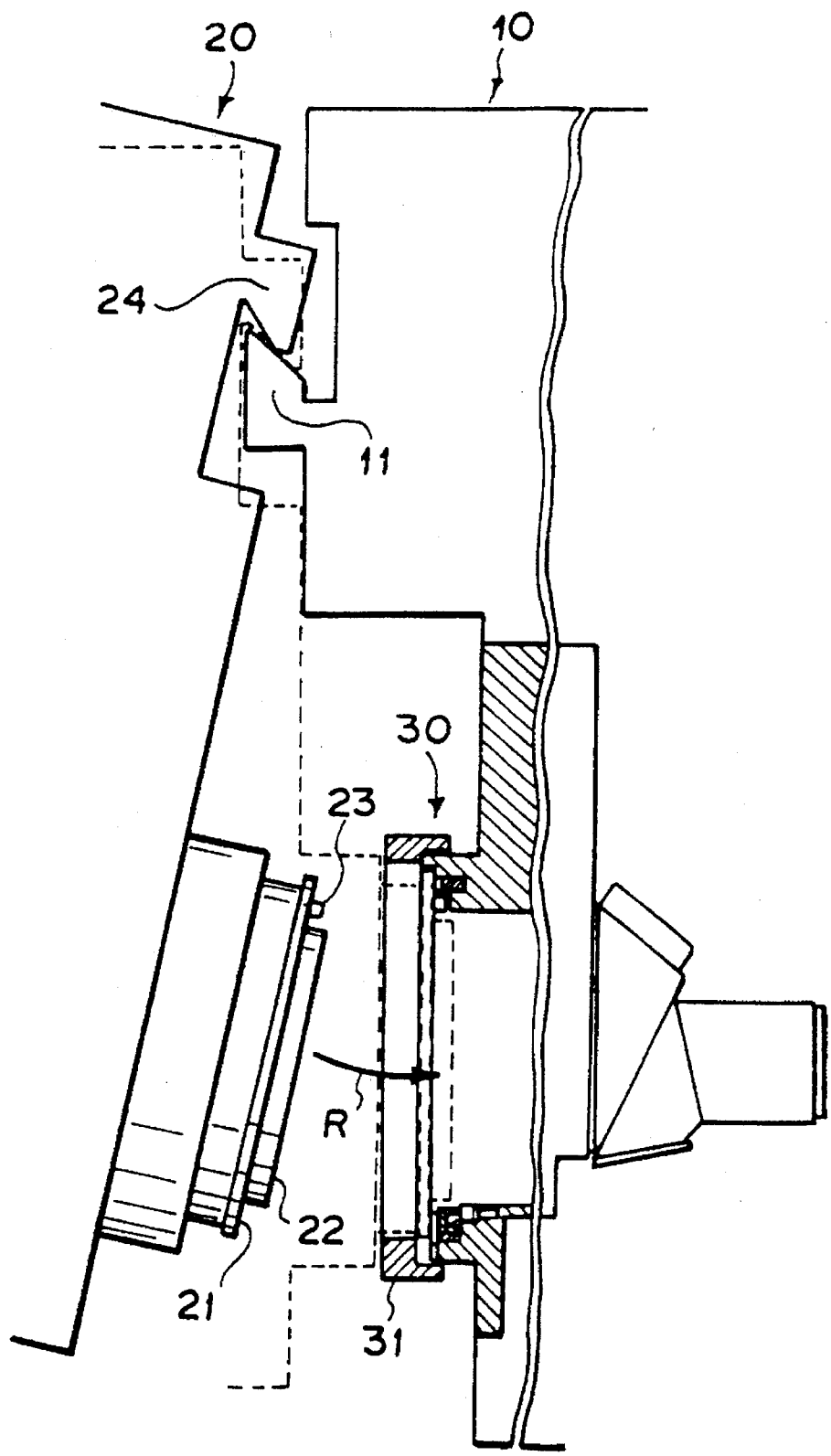
FIG. 6 is a side view showing mounting a lens with a hook mount on a camera provided with the mount of the embodiment.

As can be understood from the description above, the chucking pieces 33 are wide opened when the lens is applied to the camera and accordingly the projection 22 on the lens can be easily inserted without interference with the chucking pieces 33 even if the projection 22 is moved obliquely to the optical axis of the camera. Accordingly when the large-sized lens 20 is swung downward about the hook mounts 24 and 11 as shown in FIG. 6, the projection 22 can be accommodated in the space defined by the chucking pieces 33 without interference with the chucking pieces 33 even if the chucking pieces 33 are left on the camera body.

Though, in the mount of this embodiment, the cam ring and the chucking pieces are interlocked with the bayonet ring, the cam ring and the chucking pieces may be operated independently from the bayonet ring. For example, the cam ring may be rotated by way of a ring which can be externally operated or byway of a knob projecting outward.

Further though, in the mount of this embodiment, the camera-side bayonet ring is rotatable relative to the camera body with the lens-side bayonet ring fixed in the circumferential direction relative to the camera body, the lens-side bayonet ring may be rotatable relative to the camera body with the camera-side bayonet ring fixed. In this case, the cam ring may be interlocked with the lens-side bayonet ring by way of an engagement opening or a projection formed on the cam ring to be engaged with the stopper pin 23 or the claws on the lens-side bayonet ring 21 while the interlocking pin 31c on the camera-side bayonet ring is removed. With this arrangement, after inserting the lens-side bayonet ring 21 into the camera-side bayonet ring 31, the lens-side bayonet ring 21 is rotated in the direction of arrow X relative to the camera body, thereby bringing the bayonet rings 21 and 31 into engagement with each other. In response to the rotation of the lens-side bayonet ring 21, the cam ring 32 is rotated in the direction of arrow X by way of the interlocking mechanism described above and the chucking pieces 33 locate the lens relative to the camera body in the manner described above.

What is claimed is:

1. A lens mount for a TV camera for mounting a lens having a lens-side bayonet ring on its rear face and a cylindrical projection connected to said lens-side bayonet ring which is smaller in diameter than the lens-side bayonet ring and extends rearward coaxially with the optical axis of the lens, comprising:

a camera-side bayonet ring which is movable relative to the lens-side bayonet ring between an engagement position where the bayonet rings are engaged with each other to hold the lens on the camera and a disengagement position where the bayonet rings are disengaged from each other to permit removal of the lens from the camera, and a chucking means which is movable back and forth in a radial direction of the camera-side bayonet ring between a retracted position where it is away from the outer surface of the cylindrical projection on the lens and a chucking position where it abuts against the outer surface of the cylindrical projection.

2. A lens mount as defined in claim 1 in which said camera-side bayonet ring is rotatable relative to the camera and a means for preventing the lens-side bayonet ring from rotating relative to the camera is provided.

3. A lens mount as defined in claim 2 in which the chucking means comprises at least three chucking pieces which are supported on a support ring at regular intervals in a circumferential direction of the support ring and are movable toward and away from the longitudinal axis of the support ring which is in alignment with the optical axis of the camera between a retracted position where they are away from the outer surface of the cylindrical projection on the lens and a chucking position where they abut against the outer surface of the cylindrical projection from three directions and locate the lens so that the optical axes of the lens and the camera are aligned with each other.

4. A lens mount as defined in claim 3 in which the chucking pieces are operatively connected to the camera-side bayonet ring so that the chucking pieces are in the retracted position when the bayonet rings are in the disengagement position and is moved to the chucking position in response to movement of the camera-side bayonet ring to the engagement position.

5. A lens mount as defined in claim 4 in which the chucking pieces are operatively connected to the camera-side bayonet ring so that the chucking pieces reach the chucking position slightly before the camera-side bayonet ring reaches the engagement position.

* * * * *